Patented Apr. 17, 1934

1,954,985

UNITED STATES PATENT OFFICE 1,954,985

PROCESS FOR PRODUCING ALKYLATED PHENOLS

Hyym E. Buc, Roselle, N. J., assignor to Standard Oil Development Company, a corporation of Delaware No Drawing. Application March 12, 1931, Serial No. 522,177

11 Claims. (Cl. 260—154)

The present invention relates to a method of producing secondary and tertiary alkylated phenols and will be fully understood from the following description.

I have discovered that a mixture of secondary or tertiary alkyl phenols and aryl alkyl ethers can be produced by the action of strong, preferably concentrated, sulfuric acid upon a mixture of unsaturated hydrocarbon and phenol, from which mixture of products the alkylated phenols may be obtained. The process will be understood from the following description:

To the phenol there is added an equivalent or greater amount of moles of strong, preferably concentrated, $H_2SO_4$, and the unsaturated hydrocarbon is then added slowly with stirring. With higher secondary or with tertiary olefines such as the olefines containing more than three carbon atoms some cooling may be applied so as to keep the reaction mixture at or near room temperature while with lower boiling secondary olefines, such as propylene, gentle heating (up to 60°–70° C.) may be necessary for a practical speed of reaction. If the material turns pasty and hard to stir a solvent such as ethylene dichloride may be added. The procedure may also be reversed so that the olefine and the phenol are mixed first and then the concentrated sulfuric acid added slowly. This second procedure is preferable with tertiary olefines that is, olefines which give tertiary alcohols on hydration.

A third method, which however requires more vigorous cooling consists of mixing the secondary olefine and sulfuric acid alone and adding the phenol later. This method is hard to control due to the polymerization of the olefine and is disadvantageous unless very efficient cooling is used.

After all the constituents are added the mixture is agitated for five or six hours and the resulting product is thrown into water. If there is a separation into an aqueous acid and an oily layer the former is separated from the oily layer and the latter is then treated with a fresh portion of water and subjected to distillation with refluxing so as to hydrolyze any material combined with sulfuric acid. At the same time some low boiling constituents will distill over, such as any small amount of unchanged olefine, a little alcohol corresponding to the olefine, and any solvent that might have been added. The aqueous part is discarded or added to the first aqueous acid layer. This treatment with water and consequent refluxing may have to be repeated a few times. All these treatments with water may be designated as the hydrolyzing step.

In the case of the lower alkyl phenols, it may be that the first product is appreciably soluble in the aqueous sulfuric acid layer; in that case the hydrolysis is best effected by distilling the whole with superheated steam, first collecting the unchanged olefine, phenol and formed alcohol, then a mixture of alkylated phenol and aryl alkyl ether, finally aryl alkyl ether alone in certain cases. The fraction containing the mixture of akylated phenol may be treated like the similar fraction obtained in the case of higher olefines, which treatment will be described further below.

The crude product is subjected after the hydrolyzing step to distillation in vacuo or at atmospheric pressure according to the boiling range of the product. A small amount of unchanged, original phenol distills over first, the second, main fraction consists of a mixture of alkylated phenols and aryl alkyl ethers, finally, there is often a third fraction consisting of aryl alkyl ethers alone. The second, main fraction which contains the alkylated phenols is then treated with alkali so as to separate the phenol from the aryl alkyl ether. The aqueous alkali solution is then acidified to regenerate the alkylated phenol which is eventually purified by distillation in vacuo or at atmospheric pressure. The aryl-alkyl ether portion which does not dissolve in the alkali is added to the third fraction if there be any.

The alkali separation can also be made on the original hydrolyzed crude product, the layer containing the alkylated phenols being acidified and distilled vacuo or at atmospheric pressure. It is often desirable to carry out the alkali treatment in a counter current system.

The phenols used in the reaction may be monohydric or polyhydric phenols, such as phenol, the cresols, resorcinol or they may be hydroxyl compounds containing condensed nuclei, such as naphthol.

The sulfuric acid must be strong acid. Concentrated (93–97%) acid is preferable in most cases, although 90% or even more diluted acid will also be satisfactory. Similarly, stronger acid can also be used. The lower and upper limits of concentration of the sulfuric acid used may not be stated in definite figures because they depend on the nature of the olefine and phenol which take part in the reaction.

Any olefine of the aliphatic series above ethylene, or a cycle olefine such as cyclo-hexene, is appropriate for the reactions of the present invention. The substituted phenols obtained are always secondary or tertiary alkyl phenols, that is, phenols with a side chain of such a character that the carbon atom immediately connected with the phenol ring has two or three more carbon linkages. This rule applies to the substituted phenols obtained from both aliphatic and cyclo olefines. For the purposes of the present description, such products will be called secondary or tertiary alkyl phenols as the case may be. Normal alkyl phenol, that is, such that the carbon atom of the side chain which is immediately connected with the phenol ring has only one more carbon linkage, cannot be produced by the present method.

Although the percentage of the reaction products may vary considerably, in many cases about 20-50% of the phenol is converted into alkylated phenol and the rest into aryl alkyl ether. The amount of the alkylated phenol formed, however, may be even larger, depending on the operating conditions and the type of olefines used. For example, when propylene and phenol are brought into reaction, the largest part of the product consists of phenolic bodies. The result is similar in the case of the tertiary alkylated phenol obtained from trimethyl ethylene and phenol. Furthermore, not only mono-alkylated but also some di-alkylated phenols are obtained.

The following examples serve to illustrate my process: 1120 cc. hexene and 1000 cc. commercial cresol were mixed and then 670 cc. of 95% sulfuric acid added while the mixture was stirred and cooled with water. The stirring was continued for eight hours, then about three liters of water were added. The aqueous acid layer was drawn off and 1½ liters of water added to the upper layer. This mixture was then refluxed and distilled slowly at the same time whereby 30 cc. of hexene where recovered as a distillate. The refluxing was then interrupted, the aqueous layer removed and a liter of fresh water added, after which the refluxing was continued for a while. The mixture was then allowed to settle, the lower aqueous layer drawn off and the upper layer was subjected to distillation in vacuo under pressure of 3-1 mm. 1235 cc. of products distilled over below 192° C. (under 1-2 mm. pressure) and were recovered after condensation. These products were then treated with aqueous alkali and the alkylated phenolic products removed with aqueous alkali, then recovered after acidifying the alkali solution. There were thus finally obtained 816 cc. of aryl alkyl ethers and 293 cc. of alkylated phenols.

In another similar experiment with hexene the distillation was carried out at atmospheric pressure and the alkylated phenols were again removed from the aryl alkyl ether by means of aqueous alkali. The main body of the finally obtained alkylated phenolic product boiled between 260-270° C.

In another experiment 200 grams of resorcinol, 350 cc. of hexene and 110 cc. of 95% sulfuric acid were treated as in the preceding example with the only difference that carbon tetrachloride was added to facilitate the stirring. After separation of the aqueous acid layer 2½ liters of water were added and the mixture refluxed and slowly distilled. Some low boiling product came over and 465 gm. residual crude product was obtained, which was submitted to distillation in vacuo under a pressure varying from 6-2 mm. The product boiled between the temperatures of 245-320° C., the main part of it coming over between 285-300° C. 25% of this final product was found to consist of alkylated phenols and was insoluble in water.

For the following claims the term alkylated phenol is used to designate a phenol having one or more aliphatic or cycloparaffinic hydrocarbon radicals.

Having thus described my invention what I claim is:

1. The process of obtaining valuable derivatives from phenols, comprising bringing a mixture of a phenol and an olefinic hydrocarbon having more than two carbon atoms into reaction at a temperature below 70° C. in the presence of strong sulfuric acid of less than 100% strength and separating the acid from the reaction mixture.

2. Process according to claim 1 in which the reaction is conducted in the presence of an inert liquid solvent for said olefinic hydrocarbons.

3. The process of obtaining phenolic derivatives which comprises digesting a mixture of phenol and a hydrocarbon selected from the group consisting of aliphatic and cyclo olefines having more than two carbon atoms in the presence of strong sulfuric acid of less than 100% strength at a reaction temperature below 70° C. and subjecting the digested mixture to distillation with super-heated steam whereby a distillate is obtained containing alkylated phenol.

4. The process of obtaining phenolic derivatives which comprises digesting a mixture of a phenol and a hydrocarbon selected from the group consisting of aliphatic and cyclo olefines having more than two carbon atoms in the presence of strong sulfuric acid of less than 100% strength at a reaction temperature below 70° C., adding water, distilling and refluxing the product, separating the acid by washing with water to obtain a crude reaction product, and subjecting said crude reaction product to distillation whereby a distillate is obtained containing alkylated phenol.

5. Process for preparing alkyl phenol comprising digesting a mixture of phenol and olefin of more than two carbon atoms at a reaction temperature below about 70° C. in the presence of strong sulfuric acid of less than 100% strength.

6. Process for preparing alkyl phenol comprising digesting a mixture of phenol and olefin of more than two carbon atoms at a reaction temperature below about 70° C. in the presence of at least a molal equivalent, based on the phenol, of strong sulfuric acid of less than 100% strength.

7. Process according to claim 6 in which the sulfuric acid is from 90 to 100% strength.

8. Process for preparing alkyl phenol comprising digesting a mixture of phenol and olefin of more than three carbon atoms at a reaction temperature below about 70° C. in the presence of at least a molal equivalent, based on the phenol, of strong sulfuric acid of less than 100% strength.

9. Process according to claim 8 in which the olefin is hexene.

10. Process for preparing alkyl phenol comprising bringing a mixture of a phenol and an olefin of more than two carbon atoms into contact with strong sulfuric acid of less than 100% strength with agitation at a reaction temperature below 70° C.

11. Process according to claim 10 in which the olefin is a tertiary olefin.

HYYM E. BUC.